(12) United States Patent
Semertzidis

(10) Patent No.: US 11,797,946 B2
(45) Date of Patent: Oct. 24, 2023

(54) TRANSPORTATION BOARDING TIME NOTIFICATION

(71) Applicant: International Business Machines Corporation, Armonk, NY (US)

(72) Inventor: Konstantinos Semertzidis, Salonika (GR)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/093,975

(22) Filed: Nov. 10, 2020

(65) Prior Publication Data

US 2022/0147946 A1     May 12, 2022

(51) Int. Cl.
| | | |
|---|---|---|
| *G06Q 10/1093* | (2023.01) | |
| *G06Q 50/30* | (2012.01) | |
| *G06Q 10/02* | (2012.01) | |

(52) U.S. Cl.
CPC ......... *G06Q 10/1093* (2013.01); *G06Q 50/30* (2013.01); *G06Q 10/02* (2013.01)

(58) Field of Classification Search
CPC .... G06Q 10/02; G06Q 50/30; G06Q 30/0609; G06Q 50/14; G01C 21/3438; G01C 21/343; G01C 21/00; G01C 21/3423; G08G 1/123
See application file for complete search history.

(56) References Cited

U.S. PATENT DOCUMENTS

| | | | | |
|---|---|---|---|---|
| 6,097,317 A | * | 8/2000 | Lewiner ................ | G08G 1/123 340/991 |
| 6,137,425 A | * | 10/2000 | Oster .................... | G08G 1/123 340/992 |
| 6,374,176 B1 | * | 4/2002 | Schmier ................ | G08G 1/123 340/988 |
| 6,700,506 B1 | | 3/2004 | Winkler | |

(Continued)

FOREIGN PATENT DOCUMENTS

| | | | | |
|---|---|---|---|---|
| CN | 108177573 A | * | 6/2018 | ............ B60N 3/026 |
| EP | 2730479 B1 | | 4/2019 | |

(Continued)

OTHER PUBLICATIONS

S. Sharad, et al. "The smart bus for a smart city—A real-time implementation," 2016 IEEE International Conference on Advanced Networks and Telecommunications Systems (ANTS), 2016, pp. 1-6, doi: 10.1109/ANTS.2016.7947850. [online] <https://ieeexplore.ieee.org/document/7947850?source=IQplus> (Year: 2016).*

(Continued)

*Primary Examiner* — Jerry O'Connor
*Assistant Examiner* — Michael R Koester
(74) *Attorney, Agent, or Firm* — Michael O'Keefe

(57) ABSTRACT

In an approach to real-time scheduling of transportation boarding times, one or more computer processors receive a request for a boarding time on a bus at a bus stop from a user. One or more computer processors retrieve data associated with one or more buses. One or more computer processors (Continued)

retrieve data associated with one or more bus stops. Based on the request, the retrieved bus data, and the retrieved bus stop data, one or more computer processors compute a boarding time. One or more computer processors transmit the boarding time to the user.

14 Claims, 3 Drawing Sheets

(56) References Cited

U.S. PATENT DOCUMENTS

| | | | |
|---|---|---|---|
| 7,761,229 B2 | 7/2010 | Onishi | |
| 8,866,586 B2 | 10/2014 | Hayashi | |
| 9,462,173 B2 | 10/2016 | Oshima | |
| 2010/0095309 A1 | 4/2010 | Angell | |
| 2017/0169366 A1* | 6/2017 | Klein | G06Q 10/047 |

FOREIGN PATENT DOCUMENTS

| | | | | |
|---|---|---|---|---|
| JP | 2001503541 A | * | 12/1997 | G08G 1/123 |
| JP | 2004102644 A | * | 4/2004 | |
| KR | 20120108435 A | * | 10/2012 | |
| WO | 2005036497 A1 | | 4/2005 | |

OTHER PUBLICATIONS

Authors et al. Disclosed Anonymously, "A smart system and methods for notifying passengers of concurrent arriving buses", An IP.com Prior Art Database Technical Disclosure, IP.com No. IPCOM000211233D, IP.com Electronic Publication Date: Sep. 29, 2011, 5 Pages.

Authors et al. Disclosed Anonymously, "Buses send messages when you should get off the bus at most suitable bus stop", An IP.com Prior Art Database Technical Disclosure, IP.com No. IPCOM000198294D, IP.com Electronic Publication Date: Aug. 3, 2010, 3 Pages.

Authors et al. Disclosed Anonymously, "Location-aware checkin, seat assignment, rebooking and secure, authorized notification of passenger transfer and pickup", An IP.com Prior Art Database Technical Disclosure, IP.com No. IPCOM000220120D, IP.com Electronic Publication Date: Jul. 23, 2012, 4 Pages.

Foell et al.,"Micro-Navigation for Urban Bus Passengers: Using the Internet of Things to Improve the Public Transport Experience", Urb-IoT '14, Rome, Italy, Oct. 2014, 6 Pages.

Menon et al., "Implementation of Internet of Things in Bus Transport System of Singapore", Asian Journal of Engineering Research, vol. I, Issue IV, Jul.-Sep. 2013, 10 Pages.

Sun et al., "Models of bus boarding and alighting dynamics", Transportation Research Part A: Policy and Practice, vol. 69, pp. 447-460, Nov. 2014, 14 Pages.

Wang et al., "Modeling Bus Dwell Time and Time Lost Serving Stop in China", Journal of Public Transportation, vol. 19, No. 3, 2016, 23 Pages.

Witten et al., "Transit Bus Routing On-Demand: Developing an Energy-Saving System", Blacksburg Transit and the Virginia Tech Transportation Institute, Jun. 2015, 155 Pages.

* cited by examiner

TRANSPORTATION BOARDING TIME NOTIFICATION

BACKGROUND OF THE INVENTION

The present invention relates generally to the field of data analytics, and more particularly to real-time scheduling of transportation boarding times.

The internet of things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each "thing" is uniquely identifiable through its embedded computing system but is able to interoperate within the existing Internet infrastructure.

Telematics is an interdisciplinary field that encompasses telecommunications, vehicular technologies (road transport, road safety, etc.), electrical engineering (sensors, instrumentation, wireless communications, etc.), and computer science (multimedia, Internet, etc.). Telematics can refer to the convergence of telecommunications and information processing, and may specifically refer to automation in automobiles, such as the invention of the emergency warning system for vehicles, global positioning systems (GPS) navigation, integrated hands-free cell phones, wireless safety communications, and automatic driving assistance systems.

There is currently a growing demand for public urban transportation, such as bus service, that can lead to crowding at embarkation points with long queues and long waiting times before a user can board the transport. Long waiting times can affect passenger behavior by creating anxiety and/or irritability and can reduce the overall satisfaction of the passenger with the transportation service. In addition, it may be difficult for a passenger to determine the right time to go to an embarkation point, such as a bus stop, to find transportation with available seats. Current reservation systems used for air travel, train travel, cruise ships, etc. cannot be used for public transportation due to the dynamic change in passenger traffic within a route. Current telematic systems may provide an estimated arrival time of a bus or subway train, but they do not provide real-time information of an actual boarding time. Current mobile applications associated with public transit may indicate scheduled or estimated arrival times, but they do not consider factors such as current occupancy or a passenger's preferences.

SUMMARY

A first aspect of the present invention discloses a method including one or more computer processors receiving a request for a boarding time on a bus at a bus stop from a user. One or more computer processors retrieve data associated with one or more buses. One or more computer processors retrieve data associated with one or more bus stops. Based on the request, the retrieved bus data, and the retrieved bus stop data, one or more computer processors compute a boarding time. One or more computer processors transmit the boarding time to the user. The present invention has the advantages of reducing the waiting time for a passenger, which, in turn, can reduce anxiety and irritability of the passenger, as well as giving the ability to optimize ridership to the bus company, and to determine routes and schedules to meet demand.

A second aspect of the present invention discloses a computer program product including one or more computer readable storage media and program instructions collectively stored on the one or more computer readable storage media. The stored program instructions include program instructions to receive a request for a boarding time on a bus at a bus stop from a user. The stored program instructions include program instructions to retrieve data associated with one or more buses. The stored program instructions include program instructions to retrieve data associated with one or more bus stops. Based on the request, the retrieved bus data, and the retrieved bus stop data, the stored program instructions include program instructions to compute a boarding time. One or more computer processors transmit the boarding time to the user.

A third aspect of the present invention disclose a computer system including one or more computer processors and one or more computer readable storage media, where program instructions are collectively stored on the one or more computer readable storage media. The stored program instructions include program instructions to receive a request for a boarding time on a bus at a bus stop from a user. The stored program instructions include program instructions to retrieve data associated with one or more buses. The stored program instructions include program instructions to retrieve data associated with one or more bus stops. Based on the request, the retrieved bus data, and the retrieved bus stop data, the stored program instructions include program instructions to compute a boarding time. One or more computer processors transmit the boarding time to the user.

In another aspect, the present invention discloses a method including one or more computer processors determining an estimated time of arrival of the user to the bus stop. One or more computer processors estimate the user will arrive at the bus stop after the bus arrives. One or more computer processors assign the boarding time to another user. One or more computer processors compute a second boarding time. One or more computer processors transmit the second boarding time to the user.

DETAILED DESCRIPTION

Embodiments of the present invention recognize that efficiency may be gained and passenger satisfaction may be improved with implementation of a system that takes into consideration the occupancy of a transport in real-time, the number of passengers, or potential passengers, with the same route preference at the same time, and a prediction of available seats. Embodiments of the present invention also recognize that efficiency may be gained and passenger satisfaction may be improved by minimizing passenger waiting times by assigning passengers to time slots in which the passengers can find available seats, which also limits overcrowding at the point of embarkation. Although the basis of the present invention will be discussed with respect to a public bus system, embodiments of the present invention may also be implemented in other types of public transportation, such as subway trains, ferry boats, etc. Implementation of embodiments of the invention may take a variety of forms, and exemplary implementation details are discussed subsequently with reference to the Figures.

Figure 1:
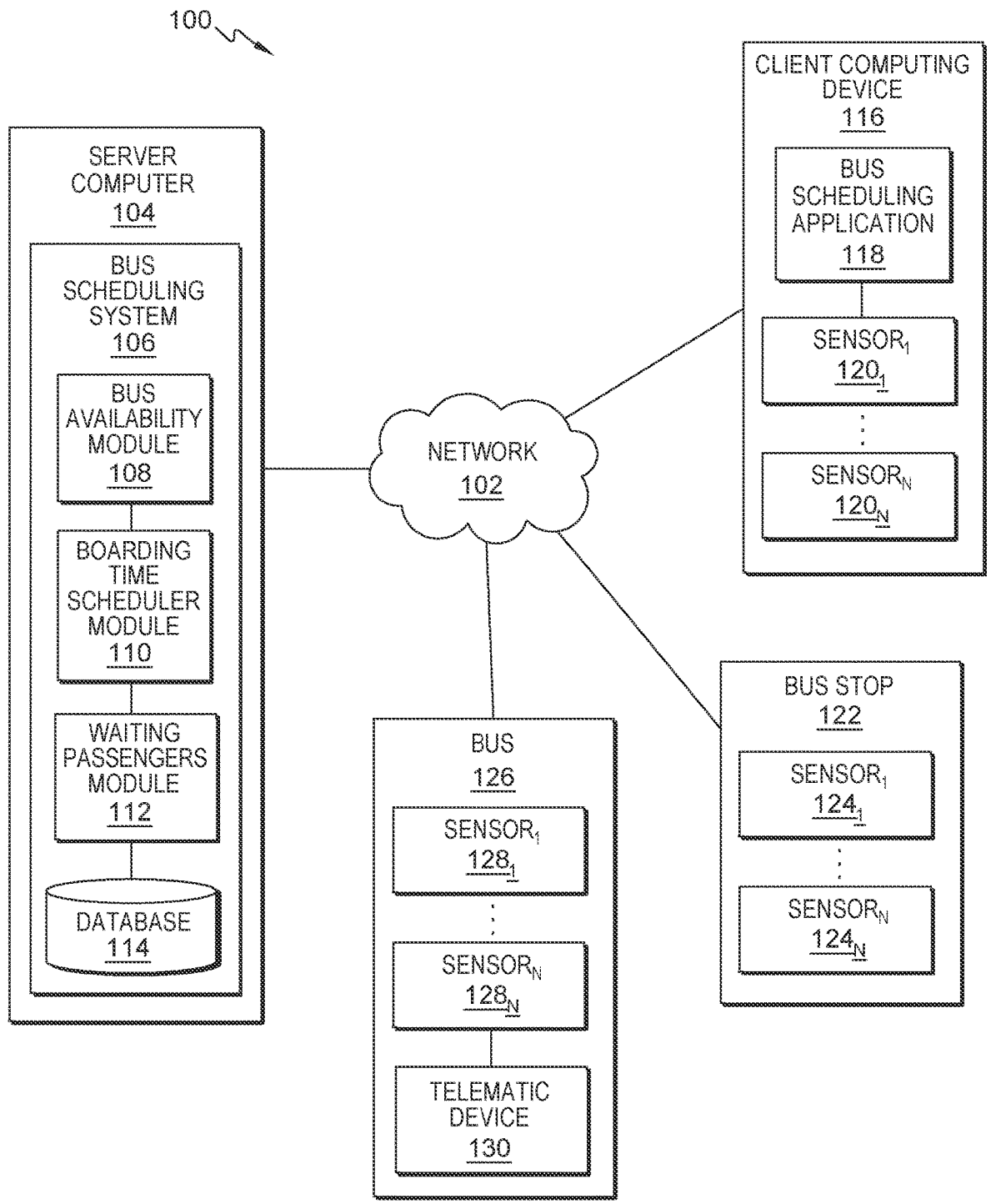
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 116, bus stop 122, and bus 126 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 116, bus stop 122, bus 126, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 116 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes bus scheduling system 106 and database 114. Server computer 104 may include internal and external hardware components, as depicted and described in further detail with respect to FIG. 3.

Bus scheduling system 106 enables avoidance of crowding at bus stops with long queues and long waiting times for buses by scheduling, for each passenger, a recommended bus stop and a recommended time to arrive at the bus stop in order to find a bus with available seats. Bus scheduling system 106 receives a request for a bus boarding time from a user. Bus scheduling system 106 retrieves data associated with one or more buses. Bus scheduling system 106 retrieves data associated with one or more bus stops. Bus scheduling system 106 computes a boarding time and transmits the boarding time to the requester. Bus scheduling system 106 includes bus availability module 108, boarding time scheduler module 110, and waiting passengers module 112. Bus scheduling system 106 is depicted and described in further detail with respect to FIG. 2.

Bus availability module 108 determines whether bus 126 has or is going to have an unoccupied seat upon arrival at a particular bus stop, such as bus stop 122. In an embodiment, bus availability module 108 retrieves, or uses, data transmitted by telematic device 130. In the depicted embodiment, bus availability module 108 is a separate software component of bus scheduling system 106. In another embodiment, the function of bus availability module 108 is integrated into the function of bus scheduling system 106.

Boarding time scheduler module 110 is responsible for scheduling a boarding time and location based on data retrieved from bus scheduling application 118, bus stop 122, and bus 126, and/or, in an embodiment, bus availability module 108. In an embodiment, boarding time scheduler module 110 uses a real-time algorithm, as would be recognized by one of skill in the art, to compute the recommended boarding time and location. In the depicted embodiment, boarding time scheduler module 110 is a separate software component of bus scheduling system 106. In another embodiment, the function of boarding time scheduler module 110 is integrated into the function of bus scheduling system 106.

Waiting passengers module 112 determines the number of passengers waiting at a bus stop, such as bus stop 122, as well as potential passengers approaching the bus stop, using data generated by sensors associated with the bus stop. In the depicted embodiment, waiting passengers module 112 is a separate software component of bus scheduling system 106. In another embodiment, the function of waiting passengers module 112 is integrated into the function of bus scheduling system 106.

Database 114 stores information used and generated by bus scheduling system 106. In the depicted embodiment, database 114 resides on server computer 104. In another embodiment, database 114 may reside elsewhere within distributed data processing environment 100, provided bus scheduling system 106 has access to database 114. A database is an organized collection of data. Database 114 can be implemented with any type of storage device capable of storing data and configuration files that can be accessed and utilized by bus scheduling system 106, such as a database server, a hard disk drive, or a flash memory. Database 114 stores data generated by sensors included in client computing device 116, bus stop 122, and bus 126, as well as data generated by telematic device 130 in bus 126. Database 114 also stores data generated by bus availability module 108, boarding time scheduler module 110, and waiting passengers module 112. Further, database 114 stores user information, such as a user profile. User profile information can include, but is not limited to, a name, an address, an email address, a credit card number, an account number, an employer, etc. Database 114 may also store user preferences with respect to preferred bus stops, bus routes, notifications, etc.

The present invention may contain various accessible data sources, such as database 114, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Bus scheduling system 106 enables the authorized and secure processing of personal data. Bus scheduling system 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Bus scheduling system 106 provides information regarding personal data and the nature (e.g., type, scope, purpose, duration, etc.) of the processing. Bus scheduling system 106 provides the user with copies of stored personal data. Bus scheduling system 106 allows the correction or completion of incorrect or incomplete personal data. Bus scheduling system 106 allows the immediate deletion of personal data.

Client computing device 116 can be one or more of a laptop computer, a tablet computer, a smart phone, smart watch, a smart speaker, or any programmable electronic device capable of communicating with various components and devices within distributed data processing environment 100, via network 102. Client computing device 116 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 116 may be integrated into a vehicle of the user. For example, client computing device 116 may include a heads up display in the windshield of the vehicle. In general, client computing device 116 represents one or more programmable electronic devices or combination of programmable electronic devices capable of executing machine readable program instructions and communicating with other computing devices (not shown) within distributed data processing environment 100 via a network, such as network 102. Client computing device 116 includes an instance of bus scheduling application 118 and sensor $120_{1-N}$.

Bus scheduling application 118 provides an interface between bus scheduling system 106 on server computer 104 and a user of client computing device 116. In one embodiment, bus scheduling application 118 is mobile application software. Mobile application software, or an "app," is a computer program designed to run on smart phones, tablet computers and other mobile devices. In one embodiment, bus scheduling application 118 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Bus scheduling application 118 enables a user of client computing device 116 to provide requests for bus boarding times, as well as user profile information and preferences to bus scheduling system 106. Bus scheduling application 118 also enables a user of client computing device 116 to receive recommended bus boarding times and boarding locations from bus scheduling system 106. Bus scheduling application 118 enables a user to request a bus boarding time for more than one person, for example, if the user is part of a group traveling together. In an embodiment, bus scheduling application 118 includes fields for starting point, destination, and number of passengers that want to board. In an embodiment, bus scheduling application 118 includes fields that display a list of nearby bus stops and the boarding time associated with each bus stop. In an embodiment, bus scheduling application 118 includes fields that display a number of passengers on a bus, a number of passengers waiting at each bus stop, and a number of other passengers that have requested a boarding time on each bus. In an embodiment, bus scheduling application 118 includes a field that displays a live status of a bus stop, enabling a user to view the status of the bus stop from one or more cameras associated with the bus stop. In an embodiment, bus scheduling application 118 displays an electronic ticket or bus pass, purchased by the user. The ticket may include a bar code or quick response (QR) code that can be scanned when the user boards the bus.

Bus stop 122 represents one or more of a plurality of bus stops associated with a bus company, a geographic area, such as a city or county, a bus system, and/or a bus route. In an embodiment, bus stop 122 is associated with a specific geographic location. In an embodiment, bus stop 122 includes a monitor (not shown) on which bus scheduling system 106 displays information associated with each bus, such as a number of passengers currently on the bus, and a number of passengers waiting to board the bus at each previous bus stop. Bus stop 122 includes sensor $124_{1-N}$.

Bus 126 represents one or more of a plurality of buses associated with a bus company, a geographic area, such as a city or county, a bus system, and/or a bus route. Bus 126 includes sensor $128_{1-N}$.

A sensor is a device that detects or measures a physical property and then records or otherwise responds to that property, such as vibration, chemicals, radio frequencies, environment, weather, humidity, light, etc. Sensor $120_{1-N}$, sensor $124_{1-N}$, and sensor $128_{1-N}$, herein sensor(s) 120, sensor(s) 124, and sensor(s) 128, detect a plurality of attributes of client computing device 116, bus stop 122, and bus 126, respectively. As used herein, N represents a positive integer, and accordingly the number of scenarios implemented in a given embodiment of the present invention is not limited to those depicted in FIG. 1. Sensor(s) 120, sensor(s) 124, and sensor(s) 128 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, sensor(s) 120, sensor(s) 124, and sensor(s) 128 include any device capable of imaging a portion of the electromagnetic spectrum. Sensor(s) 120, sensor(s) 124, and sensor(s) 128 may be one or more of a plurality of types of microphone for detecting speech and other audible sounds. Sensor(s) 120, sensor(s) 124, and sensor(s) 128 may be able to detect weather conditions, such as air temperature, relative humidity, presence and type of precipitation, wind speed, etc. Sensor(s) 120, sensor(s) 124, and sensor(s) 128 may be GPS sensors. For example, sensor(s) 128 may use GPS to detect the location of bus 126 along a route. Sensor(s) 124 may include the ability to track the number of waiting passengers as bus stop 122. Sensor(s) 128 may be integrated into bus 126. Sensor(s) 128 may include various types of pressure sensors and/or strain gauges to detect a passenger in a seat, a passenger holding a handrail or hand strap, a passenger standing in the aisle of bus 126, etc. Sensor(s) 128 may include the ability to detect motion of a door of bus 126, such as opening and closing. Sensor(s) 128 may include the ability to detect a number of boarding passengers and a number of alighting, i.e., disembarking, passengers. Sensor(s) 128 may include the ability to detect space occupied by a passenger. For example, a child may occupy less space than an adult. In another example, a passenger carrying luggage may occupy more space than a passenger that is not carrying anything. In one embodiment, sensor(s) 120, sensor(s) 124, and sensor(s) 128 transmit data directly to database 114.

Telematic device 130 retrieves, collects, and/or aggregates data generated by sensor(s) 128 and transmits the data to bus scheduling system 106 and to database 114. For example, telematic device 130 transmits the location of bus 126 by retrieving GPS data from sensor(s) 128. In another example, telematic device 130 transmits data associated with the number of boarding and alighting passengers and a current count of total passengers on bus 126.

In one embodiment, distributed data processing environment 100 includes a local WiFi® network and a central processing unit (CPU) at each bus stop and/or on each bus, enabling an instance of bus scheduling system 106 at each bus stop and/or on each bus, such that when a user of client computing device 116 requests a boarding time via bus scheduling application 118, bus scheduling system 106 processes the request locally. An advantage of such a configuration is that it may minimize overhead and network bandwidth.

Figure 2:
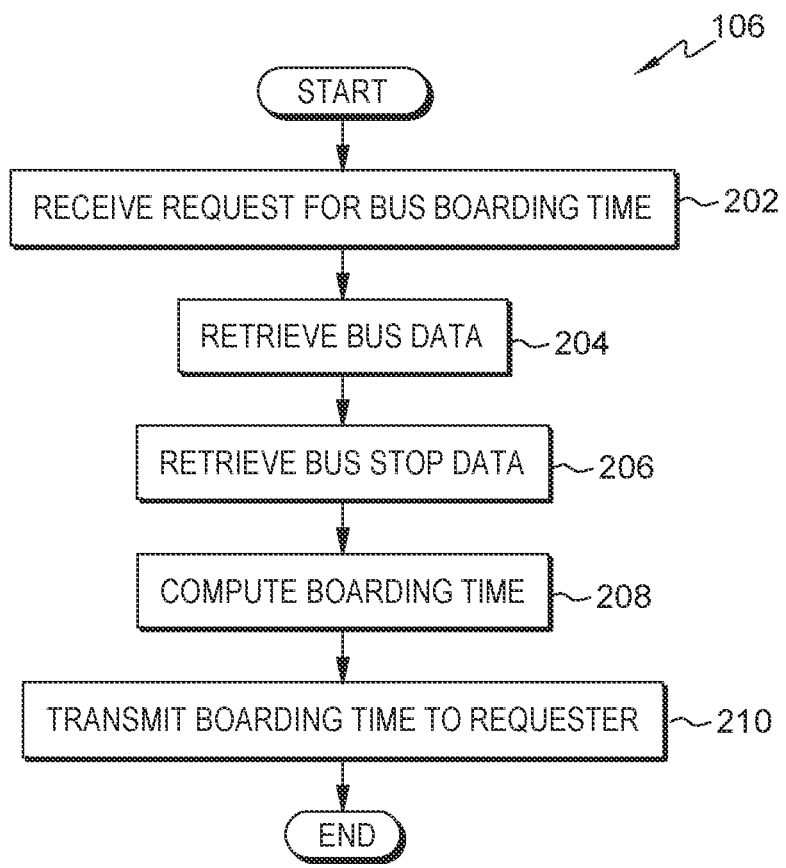
FIG. 2 is a flowchart depicting operational steps of a bus scheduling system, on a server computer within the distributed data processing environment of FIG. 1, for real-time scheduling of bus boarding times, in accordance with an embodiment of the present invention.

FIG. 2 is a flowchart depicting operational steps of bus scheduling system 106, on server computer 104 within distributed data processing environment 100 of FIG. 1, for real-time scheduling of bus boarding times, in accordance with an embodiment of the present invention.

Bus scheduling system 106 receives a request for a bus boarding time (step 202). In an embodiment, when a user of client computing device 116 requests a bus boarding time, via bus scheduling application 118, bus scheduling system 106 receives the request. In an embodiment, the request includes an identification (ID) of the requester, a desired departure time, a desired bus route, a desired destination, a desired bus stop number, a number of passengers to include in the request, and/or the location of the requestor. In an embodiment, bus scheduling system 106 can detect the location of the requestor via sensor(s) 120.

Bus scheduling system 106 retrieves bus data (step 204). In an embodiment, bus scheduling system 106 retrieves data associated with one or more buses present on the desired bus route and/or buses that stop at or near the desired destination. Bus data is data that is detected by sensor(s) 128. Bus data may include, but is not limited to, a bus ID, passenger occupancy, bus location, etc. In an embodiment, bus scheduling system 106 retrieves bus data from database 114. In another embodiment, bus scheduling system 106 retrieves bus data directly from sensor(s) 128. In yet another embodiment, bus scheduling system 106 receives bus data transmitted by telematic device 130. In an embodiment, bus scheduling system 106 receives bus data from each bus each time the bus arrives at a bus stop, such that the passenger occupancy is an updated number that includes the passengers that boarded and the passengers that alighted at that bus stop. In one embodiment, bus availability module 108 retrieves bus data to determine occupancy of the bus and transmits the passenger occupancy data to bus scheduling system 106. In an embodiment where bus scheduling application 118 provides the requester with an electronic ticket, bus scheduling system 106 and/or bus availability module 108 can determine passenger occupancy data via a near field communication (NFC) technique known in the art to count the number of passengers that boarded the bus via the scanned code on the electronic ticket. Further, bus scheduling system 106 and/or bus availability module 108 may also determine when a passenger leaves the bus by using GPS sensors included in sensor(s) 120 and sensor(s) 128 to track the location of the passenger, i.e., the user of client computing device 116, and the location of bus 126.

Bus scheduling system 106 retrieves bus stop data (step 206). In an embodiment, bus scheduling system 106 retrieves data associated with one or more bus stops on the desired bus route and/or bus stops at or near the location of the requester. Bus stop data is data that is detected by sensor(s) 124. Bus stop data may include, but is not limited to, a bus stop number or ID, a number of waiting passengers, current weather conditions, etc. In an embodiment, bus scheduling system 106 retrieves bus stop data from database 114. In another embodiment, bus scheduling system 106 retrieves bus stop data directly from sensor(s) 124. In one embodiment, waiting passengers module 112 retrieves bus stop data to determine the number of passengers at the bus stop and transmits the bus stop data to bus scheduling system 106. In an embodiment, bus stop data includes a number of passengers at bus stop 122 that are using bus scheduling application 118 as well as a number of passengers at the bus stop 122 that are not using bus scheduling application 118. By determining the number of passengers that are not using bus scheduling application 118, bus scheduling system 106 can determine a margin of error associated with an estimation of passengers waiting for bus 126.

In one embodiment, bus scheduling system 106 performs steps 204 and 206 sequentially, either step 204 followed by step 206, or step 206 followed by step 204. In another embodiment, bus scheduling system 106 performs steps 204 and 206 in parallel.

Bus scheduling system 106 computes a boarding time (step 208). In an embodiment, based on the request for a boarding time, the bus data, and the bus stop data, bus scheduling system 106 computes a recommended boarding time for the requester. By computing a boarding time based on the available data, the embodiment has the advantages of reducing the waiting time for a passenger, which, in turn, can reduce anxiety and irritability of the passenger. Another advantage of the embodiment is giving the ability to optimize ridership to the bus company, and to determine routes and schedules to meet demand. In an embodiment, the recommended boarding time also includes the bus stop ID and the bus ID. In one embodiment, bus scheduling system 106 can determine, based on data from sensor(s) 120, the estimated time of arrival of the requester, i.e., the user of client computing device 116, to bus stop 122. If bus scheduling system 106 estimates the requester will arrive at bus stop 122 after bus 126 arrives, then bus scheduling system 106 can assign the user's position in the queue to another requester, and compute a new boarding time for the user of client computing device 116. In an embodiment, in addition to the request for a boarding time, the bus data, and the bus stop data, bus scheduling system 106 uses historical data to compute the boarding time. For example, bus scheduling system 106 can retrieve historical data associated with ridership on the various bus routes to improve the estimate of a boarding time. Historical data may be based on date, such as whether or not the day is a holiday, time of day, such as whether rush hour is occurring, day of the week, such as a weekday versus a weekend day, weather conditions, such as rainy conditions versus sunny conditions, season, etc. In one embodiment, bus scheduling system 106 may schedule the boarding of passengers on a bus such that bus scheduling system 106 maintains availability of a percentage of the capacity of the bus, in the event of tourists or others that do not use bus scheduling application 118 board the bus. For example, bus scheduling system 106 may schedule passenger boarding times such that the bus is no more than 90% full. In another embodiment, bus scheduling system 106 may schedule passenger boarding times only for seats on the bus, leaving standing room for any passengers that have not requested a boarding time in advance of boarding the bus. In an embodiment where bus scheduling system 106 schedules boarding times for a private bus system, for example, within a theme park, bus scheduling system 106 may schedule passenger boarding time such that the bus is filled to capacity, but may also allow a bus driver override for exceptions. In one embodiment, boarding time scheduler module 110 computes the boarding time.

In an embodiment, bus scheduling system 106 can prioritize reservations to accommodate the largest number of requesters. For example, if bus scheduling system 106 receives a request for a boarding time for bus 126 at bus stop 122 for a total of three passengers from one requester and a similar request for a boarding time for a single passenger from a second requestor, and bus scheduling system 106 determines that when bus 126 arrives at bus stop 122 there will be three available seats, then bus scheduling system 106 computes a first boarding time for the group of three, and computes a second, later boarding time for the single passenger.

Bus scheduling system 106 transmits the boarding time to the requester (step 210). In an embodiment, bus scheduling system 106 transmits the computed boarding time to the requester via bus scheduling application 118. An advantage of the embodiment is the reduction in crowding at bus stops since passengers arrive at bus stops on a schedule that parallels the schedule of the buses. Another advantage of the embodiment is that the passenger has a reserved spot on the bus, and therefore does not have to worry when, upon arriving at the bus stop, the passenger observes that there are a large number of passengers waiting because bus scheduling system 106 determines the number of available seats on the incoming bus to match the number of passengers at the bus stop. In an embodiment, bus scheduling system 106 offers the requester, via bus scheduling application 118, an option to receive live updates in case there are any changes in the estimated time of arrival of bus 126 at bus stop 122. In an embodiment, bus scheduling system 106 tracks the location of the requester, i.e., the user of client computing device 116, via sensor(s) 120, and when the requester reaches the bus stop, bus scheduling system 106, or waiting passengers module 112, can add the requester to the number of waiting passengers.

Figure 3:
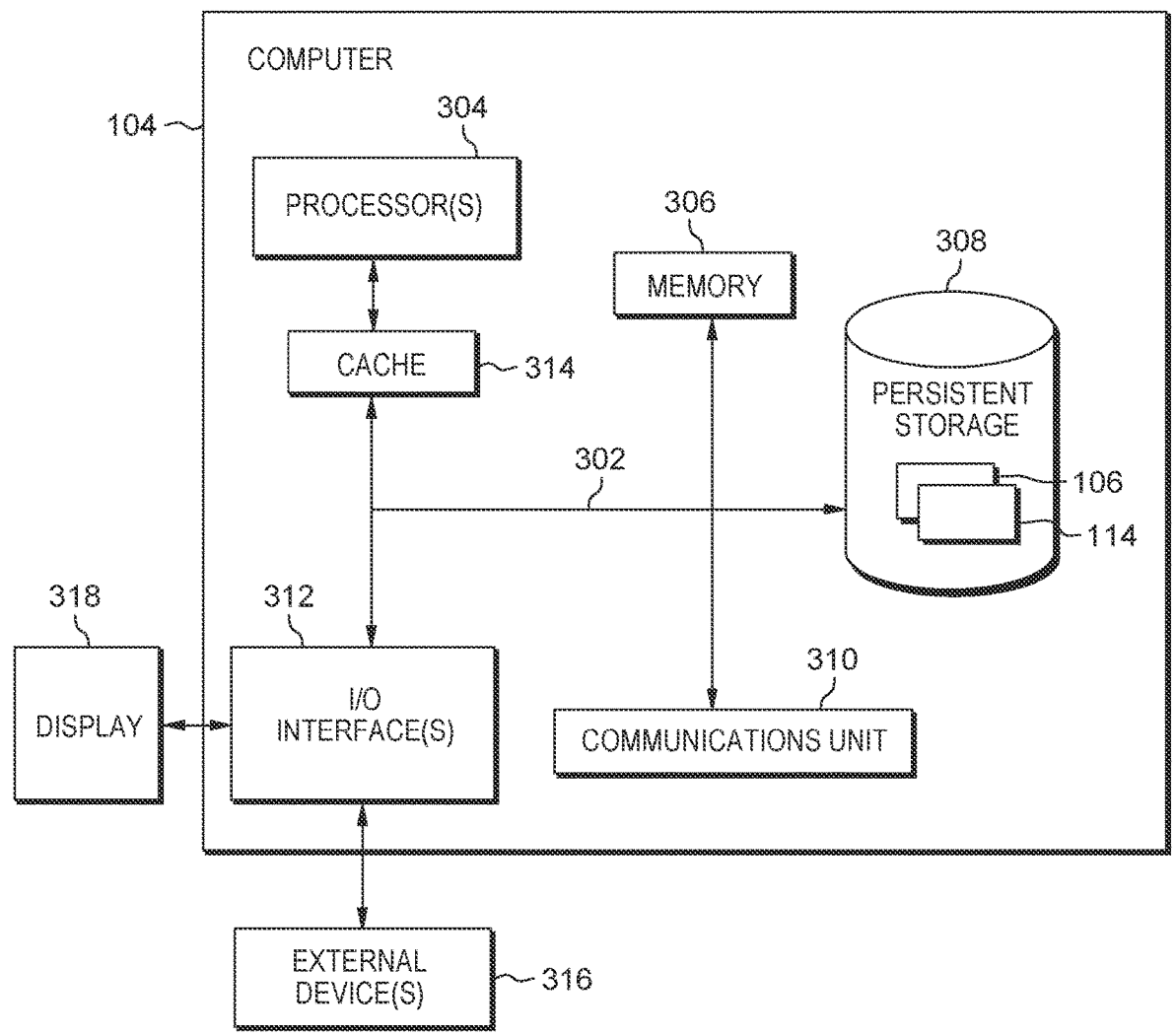
FIG. 3 depicts a block diagram of components of the server computer executing the bus scheduling system within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., bus scheduling system 106 and database 114, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 116, bus stop 122, and bus 126. In these examples, communications unit 310 includes one or more network interface cards. Communications unit 310 may provide communications through the use of either or both physical and wireless communications links. Bus scheduling system 106, database 114, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., bus scheduling system 106 and database 114 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, a request for a boarding time on a bus at a bus stop from a user;
    retrieving, by one or more computer processors, data associated with one or more buses, wherein the data is generated by one or more sensors integrated into the one or more buses and includes a current count of total passengers on the one or more buses, and wherein at least one of the one or more sensors detects a passenger holding a hand strap of the bus;
    retrieving, by one or more computer processors data associated with one or more bus stops from one or more sensors integrated into the one or more bus stops;
    determining, by one or more computer processors, a seating capacity of the bus;
    determining, by one or more computer processors, whether a pre-defined threshold percentage of the seating capacity of the bus is exceeded by previously scheduled passengers;
    based on the request, the retrieved bus data, the retrieved bus stop data, and a determination that the pre-defined threshold percentage of the seating capacity of the bus is not exceeded by previously scheduled passengers computing, by one or more computer processors, the boarding time;
    transmitting, by one or more computer processors, the boarding time to the user, wherein the boarding time indicates a reserved spot on the bus for the user;
    determining, by one or more computer processors, an estimated time of arrival of the user to the bus stop;
    estimating, by one or more computer processors, the user will arrive at the bus stop after the bus arrives;
    assigning, by one or more computer processors, the boarding time and the reserved spot on the bus previously transmitted to the user to another user;
    computing, by one or more computer processors, a second boarding time, and
    transmitting, by one or more computer processors, the second boarding time to the user.

2. The computer-implemented method of claim 1, wherein the request for the boarding time includes one or more of: an identification of the user, a desired departure time, a desired bus route, a desired destination, a desired bus stop number, a number of passengers to include in the request, and a location of the user.

3. The computer-implemented method of claim 1, wherein data associated with the bus includes one or more of: a bus identification, a passenger occupancy of the bus, and a location of the bus.

4. The computer-implemented method of claim 1, wherein data associated with the bus stop includes one or more of: a bus stop identification, a number of waiting passengers, and a current weather condition.

5. The computer-implemented method of claim 1, further comprising:
    retrieving, by one or more computer processors, historical data associated with ridership on a plurality of bus routes; and
    wherein computing the boarding time is further based on the retrieved historical data.

6. A computer program product comprising:
    one or more computer readable storage devices and program instructions collectively stored on the one or more computer readable storage devices the stored program instructions comprising:
    program instructions to receive a request for a boarding time on a bus at a bus stop from a user;
    program instructions to retrieve data associated with one or more buses, wherein the data is generated by one or more sensors integrated into the one or more buses and includes a current count of total passengers on the one or more buses, and wherein at least one of the one or more sensors detects a passenger holding a hand strap of the bus;
    program instructions to retrieve data associated with one or more bus stops from one or more sensors integrated into the one or more bus stops;
    program instructions to determine a seating capacity of the bus;
    program instructions to determine whether a pre-defined threshold percentage of the seating capacity of the bus is exceeded by previously scheduled passengers;
    based on the request, the retrieved bus data, the retrieved bus stop data, and a determination that the pre-defined threshold percentage of the seating capacity of the bus is not exceeded by previously scheduled passengers, program instructions to compute the boarding time;
    program instructions to transmit the boarding time to the user, wherein the boarding time indicates a reserved spot on the bus for the user;
    program instructions to determine an estimated time of arrival of the user to the bus stop;
    program instructions to estimate the user will arrive at the bus stop after the bus arrives;
    program instructions to assign the boarding time and the reserved spot on the bus previously transmitted to the user to another user;
    program instructions to compute a second boarding time, and
    program instructions to transmit the second boarding time to the user.

7. The computer program product of claim 6, wherein the request for the boarding time includes one or more of: an identification of the user, a desired departure time, a desired bus route, a desired destination, a desired bus stop number, a number of passengers to include in the request, and a location of the user.

8. The computer program product of claim 6, wherein data associated with the bus includes one or more of: a bus identification, a passenger occupancy of the bus, and a location of the bus.

9. The computer program product of claim 6, wherein data associated with the bus stop includes one or more of: a bus stop identification, a number of waiting passengers, and a current weather condition.

10. The computer program product of claim 6, the stored program instructions further comprising:
    program instructions to retrieve historical data associated with ridership on a plurality of bus routes; and
    wherein program instructions to compute the boarding time are further based on the retrieved historical data.

11. A computer system comprising:
    one or more computer processors;
    one or more computer readable storage media;
    program instructions collectively stored on the one or more computer readable storage media for execution by at least one of the one or more computer processors, the stored program instructions comprising:
    program instructions to receive a request for a boarding time on a bus at a bus stop from a user;
    program instructions to retrieve data associated with one or more buses, wherein the data is generated by one or more sensors integrated into the one or more buses and includes a current count of total passengers on the one or more buses, and wherein at least one of the one or more sensors detects a passenger holding a hand strap of the bus;
    program instructions to retrieve data associated with one or more bus stops from one or more sensors integrated into the one or more bus stops;
    program instructions to determine a seating capacity of the bus; program instructions to determine whether a pre-defined threshold percentage of the seating capacity of the bus is exceeded by previously scheduled passengers;
    based on the request, the retrieved bus data, the retrieved bus stop data, and a determination that the pre-defined threshold percentage of the seating capacity of the bus is not exceeded by previously scheduled passengers, program instructions to compute the boarding time;
    program instructions to transmit the boarding time to the user, wherein the boarding time indicates a reserved spot on the bus for the user;
    program instructions to determine an estimated time of arrival of the user to the bus stop;
    program instructions to estimate the user will arrive at the bus stop after the bus arrives;
    program instructions to assign the boarding time and the reserved spot on the bus previously transmitted to the user to another user;
    program instructions to compute a second boarding time, and
    program instructions to transmit the second boarding time to the user.

12. The computer system of claim 11, wherein the request for the boarding time includes one or more of: an identification of the user, a desired departure time, a desired bus route, a desired destination, a desired bus stop number, a number of passengers to include in the request, and a location of the user.

13. The computer system of claim 11, wherein data associated with the bus includes one or more of: a bus identification, a passenger occupancy of the bus, and a location of the bus.

14. The computer system of claim 11, the stored program instructions further comprising:
    program instructions to retrieve historical data associated with ridership on a plurality of bus routes; and
    wherein program instructions to compute the boarding time are further based on the retrieved historical data.

\* \* \* \* \*